United States Patent [19]
Kumagai et al.

[11] Patent Number: 5,779,843
[45] Date of Patent: Jul. 14, 1998

[54] METHOD OF FUSION WELDING RESIN ARTICLES DIFFICULT TO MELT

[75] Inventors: Masaru Kumagai, Yao; Yoshiaki Hukuhara, Hirakata, both of Japan

[73] Assignees: Toua Kokyu Tugitevarubu Seizo Co. Ltd; EF Tekuno Limited Company, both of Japan

[21] Appl. No.: 711,954

[22] Filed: Sep. 6, 1996

[51] Int. Cl.⁶ .................... F16L 47/02; F16L 47/06
[52] U.S. Cl. .................... 156/274.2; 156/273.9; 156/294; 156/304.2; 156/304.6; 156/308.6; 285/21.2; 219/535; 219/544
[58] Field of Search .................... 186/294, 304.2, 186/304.6, 309.6, 308.6, 274.2, 273.9; 285/21.2, 21.3; 219/535, 544

[56] References Cited

U.S. PATENT DOCUMENTS

| | | |
|---|---|---|
| 4,508,368 | 4/1985 | Blumenkranz .................... 258/21.2 |
| 4,606,558 | 8/1986 | Davidson .................... 285/21.3 |
| 4,724,028 | 2/1988 | Zabielski et al. .................... 156/308.6 |

*Primary Examiner*—Michael W. Ball
*Assistant Examiner*—Sam Chuan Yao
*Attorney, Agent, or Firm*—Harold Gell

[57] ABSTRACT

In a method of fusion welding resin articles difficult to melt due to a fusion retarder present in the articles in the form of a fusion retarding element or structure, the articles having surface portions in contact with each other so as to be bonded one to another, a fusion accelerator is applied to the surface portions, with the accelerator being capable of destroying the fusion retarder when heated. After or simultaneously with this step, the resin articles are heated so that the fusion accelerator destroys the fusion retarder, so as to cause the surface portions to melt, before finally allowing the resin articles to cool down.

9 Claims, 6 Drawing Sheets

METHOD OF FUSION WELDING RESIN ARTICLES DIFFICULT TO MELT

FIELD AND BACKGROUND OF THE INVENTION

The present invention relates to a method of fusion welding resin articles that are difficult to melt and bond one to another.

According to one of the prior art fusion welding or bonding methods, a length of electric wire is interposed between surface portions of resin articles. An electric current is then supplied through the wire so as to fuse and weld said portions to each other. It is however noted that the molecular weight of branched resin molecules is considerably high due to their three-dimensional networks. There is also known a certain kind of resins whose molecular weight is extremely high so that it has been difficult to fusion weld them rapidly and strongly. An improvement proposed to overcome this problem employs a 'double layer' structure for the resin articles wherein a hardly fusible core is covered with an easily fusible surface layer.

The 'double layered' articles must however be produced using a sophisticated and specially designed mold that is highly expensive. Further, the molding rate and temperature have to be controlled severely, thereby lowering the efficiency and raising the production cost. Mechanical strength, chemical resistance, heat resistance and weather resistance of such 'double layered' resin articles are not necessarily satisfactory.

SUMMARY OF THE INVENTION

An object of the present invention is therefore to provide a method of fusion welding resin articles difficult to melt, the method being designed such that the articles can be bonded one to another at a desired fusion strength within a limited period of time, in such a manner that final resin products of an improved quality can be produced inexpensively.

The resins that are difficult to melt and weld are: a branched polyethylene or the like; a branched polychlorinated or poly-fluorinated ethylene; fluoroplastics; poly-diallyl phthalates; polyimide resins; Bakelite (a registered trademark); epoxy resins; phenolic resins; guanamine resins; xylene resins; furan resins; alkyd resins; polyurethane resins; polymaleate resins; melamine resins; urea resins; liquid crystalline resins; and ultra-high polymer resins.

In accordance with the present invention, the method proposed herein does employ such a fusion accelerator that will destroy or diminish a fusion retarder so as to enable the fusion welding of the resin articles difficult to melt. The fusion retarder may be a molecular structure itself or its component. For example, an aromatic ring or circular group contained in each resin molecule will make stiff the molecule, thus being called 'fusion retarder'. An extremely high molecular weight which will hinder the fusion welding is also referred to herein as 'fusion retarder'. Intermolecular cross-linking as well as the van der Waals bonds such as intermolecular hydrogen bonds will similarly bring about the effect of retarding or hindering fusion. The fusion accelerator disable these fusion retarders at high temperatures by hydrolysis, alcoholysis, ammonolysis, trans-esterification, oxidation, radical reaction or the like chemical reaction. The effective size of resin molecules will thus be decreased owing to such chemical reactions taking place between the retarder and the accelerator, thereby facilitating the fusion welding and realizing a desired bond strength.

In detail, the cross-linking or intermolecular bonds will be extinguished, or alternatively the resin molecules themselves are torn into smaller molecules by the method of the present invention.

The preferred fusion accelerators are:

inorganic hydroxides such as sodium hydroxide, potassium hydroxide, aluminum hydroxide and barium hydroxide;

sulfuric acid and sulfates such as zinc sulfate, aluminum sulfate, ammonium sulfate, sodium sulfate and hydroxylamine sulfate;

hydrochloric acid and chlorides such as ammonium chloride and guanidine chloride;

acetic acid and acetates such as manganese acetate, lead acetate and cobalt acetate;

carboxylic acids whose molecular formula is:

R—$(COOH)_n$, wherein R=H, $C_1$–$C_{18}$, n=1–4, and salts of these carboxylic acids;

sulfonic acids whose molecular formula is:

R—$(SO_3H)_n$, wherein R=H, $C_1$14 $C_{18}$, n=1–4, and salts of these sulfonic acids;

phosphoric acid and salts thereof;

acidic esters of phosphoric acid and salts thereof;

boric acid and salts thereof;

pyridine and salts thereof;

pyridinium dichromate;

pyridine derivatives including 4-dimethylamino pyridine and 4-pyrrolidino pyridine, an aqueous solution, an emulsion or a microcapsuled suspension of such derivatives or salts thereof;

amines whose molecular formula is: R—$(NH_2)_n$, wherein R=H, $C_1$–$C_{18}$, n=1–4;

urea and guanidine;

amino alcohols whose molecular formula is: $(HO)_m$—R—$(NH_2)_n$, wherein R=H, $C_1$–$C_{18}$, m=1–4, n=1–4, and salts of these amino alcohols;

alcohols whose molecular formula is: R—$(OH)_n$, wherein R=H, $C_1$–$C_{18}$, n=1–6, and derivatives of these alcohols;

perchlorates such as ammonium perchlorate, potassium perchlorate and lithium perchlorate;

nitric acid and nitrates such as bismuth nitrate, barium nitrate, potassium nitrate, calcium nitrate, aluminum nitrate, ammonium nitrate, cobalt nitrate, sodium nitrate, iron nitrate, lead nitrate, nickel nitrate and guanidine nitrate;

nitro compounds including: nitroparaffin having a molecular formula: R—$(NO_2)_n$, wherein R =H, $C_1$–$C_{18}$, n=1–4; nitroglycerin; and picric acid;

quinones including: p-quinone dioxime; and p,p'-dibenzoylquinone dioxime;

alkyl peracetic acids having a molecular formula: R—$(COOOH)_n$, wherein R=H, $C_1$–$C_{18}$, n=1–4; and salts of these acids;

peracetic acid and salts thereof;

hydrogen peroxide (in the form of an aqueous solution); and a variety of organic peroxides, such as ketone peroxides, hydro-peroxides, dialkyl peroxides, diacyl peroxides, peroxy-esters, peroxy-dicarbonates, peroxy-monocarbonates, alkyl peroxides and peroxy-ketals, wherein their typical examples are:

2,5-dimethyl-2,5-bis(t-butylperoxy) hexane;

2,5-dimethyl-2,5-bis(t-butylperoxy) hexyne-3;

dicumyl peroxide;

di-t-butyl peroxide;

t-butyl hydroperoxide; and t-butyl trimethyl silyl peroxide.

Each molecule of the peroxides listed above may contain one or two of the group —O—O—. Any mixture of those peroxides may be employed in the method proposed herein.

The alkyl group constituting the organic peroxides may contain: any circular subgroups, any branched portions, double or triple bonds, aromatic subgroups, any halogens, ester subgroups, phosphate or phosphite groups, ether or thioether bonds, amino groups, nitro or nitroso groups, hydroxyl groups, thiol groups, sulphonyl or sulphinyl groups, carboxyl or acyl groups, oxime groups, amide or imide groups, cyano or isosyano groups, guanidyl groups, epoxy groups or any other heterologous elements. It is desirable that the peroxides will not smell bad when decomposed during the fusion welding. For this purpose, any decomposed products of said peroxides have to be odorless, or must have such a low vapor pressure that any sensible amount of vapor will not be emitted during the fusion welding process, or the decomposed products will form an odorless and nonvolatile complex or the like. Thus, the alkyl group constituting the organic peroxides may preferably be: methyl, ethyl, propyl and its isomer, butyl and its isomers, pentyl and is isomers, hexyl and its isomers, cyclohexyl, hexenyl, trimethylcyclohexyl and its isomers, cyclododecyl and the like aliphatic groups, phenyl, cumyl, naphthyl and the like aromatic groups, polyalkyl peroxides, polystyrol peroxides, polyacrylic or polymethacrylic peroxides, acyl peroxide polymers or the like polymers containing peroxide groups, any copolymers of these monomers, and any mixtures thereof. Any of or any mixture of these peroxides may be used, with or without any suitable additives such as: ethyleneglycol dimethacrylate; trimethylolpropane trimethacrylate; triallyl cyanurate, isocyanurate or the like cyanurates; sulphur; quinone dioxime or the like dioximes; guanidine; N,N'-phenylene bismaleimide; phosphorous; hydroquinones; imidazoles; benzothiazoles; thiuram sulfides; amines; thioureas; zinc oxide; and epoxy compounds.

Further additives that are miscible with the decomposition products of the resins difficult to melt and also miscible with a carrier for the fusion accelerators and decomposition products thereof include:

benzoyl peroxide;

lead, calcium or barium peroxide;

per-iodates such as sodium periodate;

permanganates such as potassium permanganate;

perborates such as sodium perborate;

persulfates such as potassium, ammonium or sodium persulfate;

highpolymeric oxidants such as polypyridinium dichromate;

dioxides such as manganese or lead dioxide;

chromic anhydride, chromates and dichromates;

tetraoxides such as osmium or ruthenium tetraoxide, and salts thereof;

pentoxides such as vanadium pentoxide;

esters of phosphoric acid, esters of phosphorous acid, and esters of thiophosphoric acid such as alkyl dithiophosphate, wherein the phosphates have the formula: $R_1, R_2, R_3$—$PO_4$ in which each of $R_1, R_2$ and $R_3$ is H or $C_1$–$C_{18}$;

esters of carboxylic acids expressed by: $R_1$—(COO—$R_2$)$_n$, wherein $R_1$ and $R_2$ are alkyl groups each having 1–18 carbon atoms, and n=1–4;

further esters of carboxylic acids expressed by: ($R_1$—COO)$_n$—$R_2$, wherein $R_1$ and $R_2$ are H or alkyl groups each having 1–18 carbon atoms, and n=1–4;

amides of carboxylic acids expressed by: ($R_1$—(CONH—$R_2$)$_n$, wherein $R_1$ and $R_2$ are H or alkyl groups each having 1–18 carbon atoms, and n=1–4;

further amides of carboxylic acids expressed by: ($R_1$—CONH)$_n$—$R_2$, wherein $R_1$ and $R_2$ are H or alkyl groups each having 1–18 carbon atoms, and n=1–4;

imides expressed by: ($R_1$—CO—N—($R_3$)—CO—$R_2$, wherein $R_1$ $R_2$ and $R_3$ are H or alkyl groups each having 1–18 carbon atoms, and n=1–4;

further compounds whose molecular formula is: $R_1$,$R_2$—C(CN)—N=N—C(CN)—$R_3$, $R_4$ wherein each of $R_1$, $R_2$, $R_3$ and $R_4$ is H or an alkyl having 1–18 carbon atoms;

azo-bisisobutyronitrile and azo-dicarbonic amide;

ethylene carbonate;

inorganic compounds or elements such as ammonium alum, borax, red phosphorous and sulphur; and adhesives and surfactants.

Cations forming the salts as the further additives listed above may be selected from the group consisting of: barium, lithium, ammonium, sodium, aluminum, cobalt, manganese, iron, nickel, guanidine, zinc, potassium, calcium, chromium, cadmium, platinum, hydrogen ( i.e., proton), magnesium, titanium, vanadium, copper, hydro-xylamines and the like. The alkyl group 'R' constituting the organic compounds as the further additives may contain: any circular subgroups, any branched portions, double or triple bonds, aromatic subgroups, any halogens, phosphate or phosphite groups, ether or thioether bonds, amino groups, nitro or nitroso groups, hydroxyl groups, thiol groups, sulphonyl or sulphinyl groups, carboxyl or acyl groups, oxime groups, amide or imide groups, cyano or isosyano groups, guanidyl groups, epoxy groups or any other heterologous elements. The alkyl groups R1 and R2 in the compound having the —N=N— bond may be the same as the other groups R3 and R4, such that this compound is of a circular structure.

The fusion accelerator may be applied to the plastics articles in the following manner, so as to facilitate the fusion welding thereof.

In a first preferable mode of practicing the method proposed herein, the surfaces of plastics articles to be fusion welded will previously be coated with the fusion accelerator.

In a second mode, a tape impregnated with the accelerator, or alternatively a tube holding it in an encapsulated state, will previously be applied to the article surfaces.

In a third mode, an injector will force the accelerator in between the article surfaces, prior to or simultaneously with the fusion welding.

In a fourth mode, the fusion accelerator will be previously contained or embedded in an insulating coat of a heating wire.

In a fifth mode, the insulating coat of the heating wire will previously be covered with a surface layer of the accelerator. Before application of the fusion accelerator, it may be diluted with or emulsified in an amount of water, any proper hydrocarbon solvent, alcohol, ester or ether, any appropriate silicone oil or grease, if necessary or desired.

In a sixth mode of the present method, a tape impregnated with the accelerator, or alternatively a tube holding it in an encapsulated state, will previously be attached to the outer surface of the heating wire for use to melt the article surfaces.

The tape or tube employed in the second and sixth modes may be prepared by directly dispersing the accelerator, or spreading its microcapsules, in the material of said tape or tube when the latter is molded. Alternatively, a number of fine cavities may be formed in the body of said tape and tube so as to receive and hold the accelerator.

In operation, the fusion accelerator added to the plastics articles in the described manner will destroy the fusion retarding element or structure of said articles at elevated temperatures, due to hydrolysis, alcoholysis, ammonolysis, trans-esterification, oxidation or radical reactions. As a result, the effective molecular weight of the resin molecules is reduced to facilitate the fusion welding and to remarkably improve the weld strength.

In one of the most preferable manners, the peroxide listed above is contained in one of the plastics articles to be fusion welded so that the peroxide decomposes to produce radicals. These radicals will take hydrogen atoms off the other plastics article, thereby decreasing its molecular weight and thus enabling the fusion welding. Such a dehydrogenation will bring about new chemical bonds between the surfaces of plastics articles, thus raising the weld strength. If the resin forming the plastics articles is designed to contain unsaturated chemical bonds, then the cross-linking will take place between them, further improving the weld strength.

THE PREFERRED EMBODIMENTS

First Embodiment

The following ingredients were kneaded to give a coating resin composition ('parts'=parts by weight):

| | |
|---|---|
| polyethylene | 100 parts |
| water (as a fusion accelerator) | 2 parts |
| butanol (ibid.) | 2 parts |
| butyl amine (ibid.) | 2 parts |
| 2,5-dimethyl-2,5-bis(t-butylperoxy) hexane (ibid.) | 0.5 parts |
| 4-dimethyl aminopyridine (ibid.) | 0.5 parts |
| sodium perborate (ibid.) | 0.5 parts |
| triallyl cyanurate (ibid.) | 0.5 parts |

A length of a heating wire (e.g. nickel wire) was coated with this resin composition so as to have a sheath of a predetermined thickness. The coated wire was set in place between a pair of plastics articles, which were previously formed of resins such as a 'cross-linked' polyethylene difficult to melt. An electric current was supplied through that wire to fusion weld the articles one to another.

Figure 1:
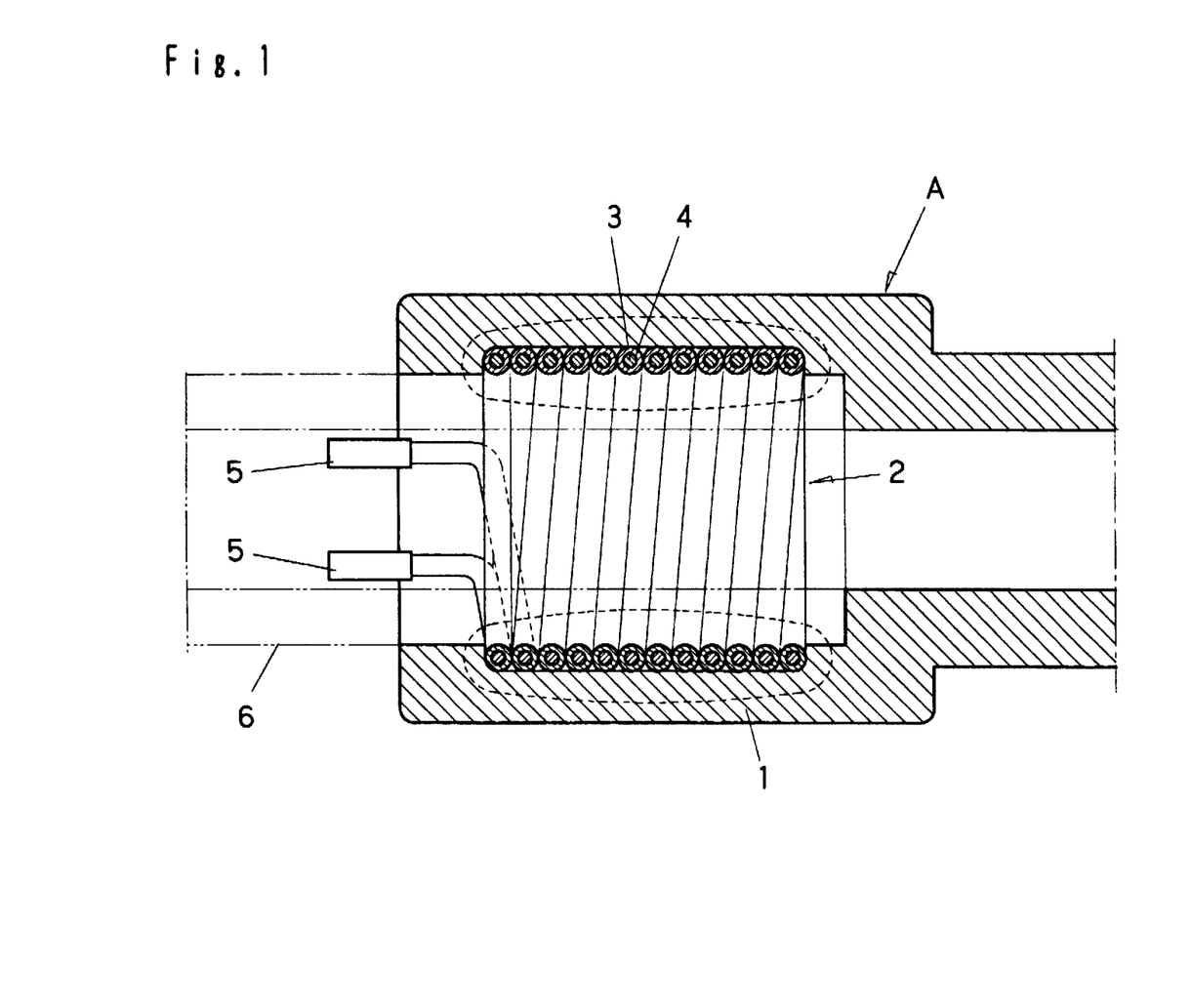
FIG. 1 is a cross section of EF joint members to which the method proposed herein is applied in an embodiment.

FIG. 1 illustrates an example of the first embodiment. The reference numeral 1 denotes one of a pair of socket portions which an electro-fusion joint (viz., EF joint) 'A' possesses. This EF joint 'A' is made of a cross-linked polyethylene. A heating element 2 is embedded in the inner peripheral surface of the socket portion 1. A length of electric wire 3 such as a nickel wire is covered with an insulating sheath 4 that is formed of a resin containing a fusion accelerator. The length of electric wire 3 is folded over and coiled to assume a sleeve-like shape, before embedded in the inner surface of the socket portion. Both the ends 5 of the wire 3 protrude outwardly from the joint's socket portion 1 so as to serve as a pair of terminal pins.

Such an EF joint 'A' may be prepared by the injection molding. An amount of molten resin (e.g., polyethylene) having a cross-linking agent dispersed therein will be injected into a cavity of a mold in which the heating element 2 is previously set in place. On the other hand, a pipe, for example a gas pipe to be connected to the socket portion 6 of the joint 'A' will be made by extruding through a die a molten resin that also contains a cross-linking agent.

With an end of the gas pipe 6 being inserted in the socket portion 1 of joint 'A', the electric wire 3 extending through the heating element 2 will be supplied with a current of an appropriate intensity for a given time. Consequently, the insulating sheath 4 covering the wire 3 and containing the fusion accelerator will melt at first and then cause the surface portions of gas pipe 6 and EF joint 'A' to melt. Thus, a region enclosed with a dotted line in FIG. 1 fuses so that contact portions of the resin articles 6 and 'A' are welded to each other.

There are many alternative manners in applying the fusion accelerator to the EF joint 'A' and the gas pipe 6. For example, a coat of the accelerator may be formed on each of outer and inner peripheries of the sleeve-shaped heating element 2. Alternatively, a tape such as an adhesive tape formed of the same resin as the insulating sheath 4 may previously be wounded on the peripheral surfaces of said element 2, or on the outer periphery of the end of gas pipe 6. The adhesive tape may not necessarily be made of such a fusion accelerating resin, but be formed of an ordinary resin to have a side that is free of adhesives and coated with a fusion accelerating layer. Further, the fusion accelerating composition may be painted or other applied to both or either of the inner periphery of EF joint 'A' and the outer periphery of gas pipe 6. A syringe may be used to inject an amount of the fusion accelerating composition into the contact region, during or prior to the welding. A pin hole pierced by a needle of the syringe will be closed with a molten and subsequently solidifying resin. Spy holes are generally formed through the walls of EF joints, so that visual inspection of the fusion and welding process. In this case, the injection with the syringe can be done conveniently through such a spy hole.

Figure 2:
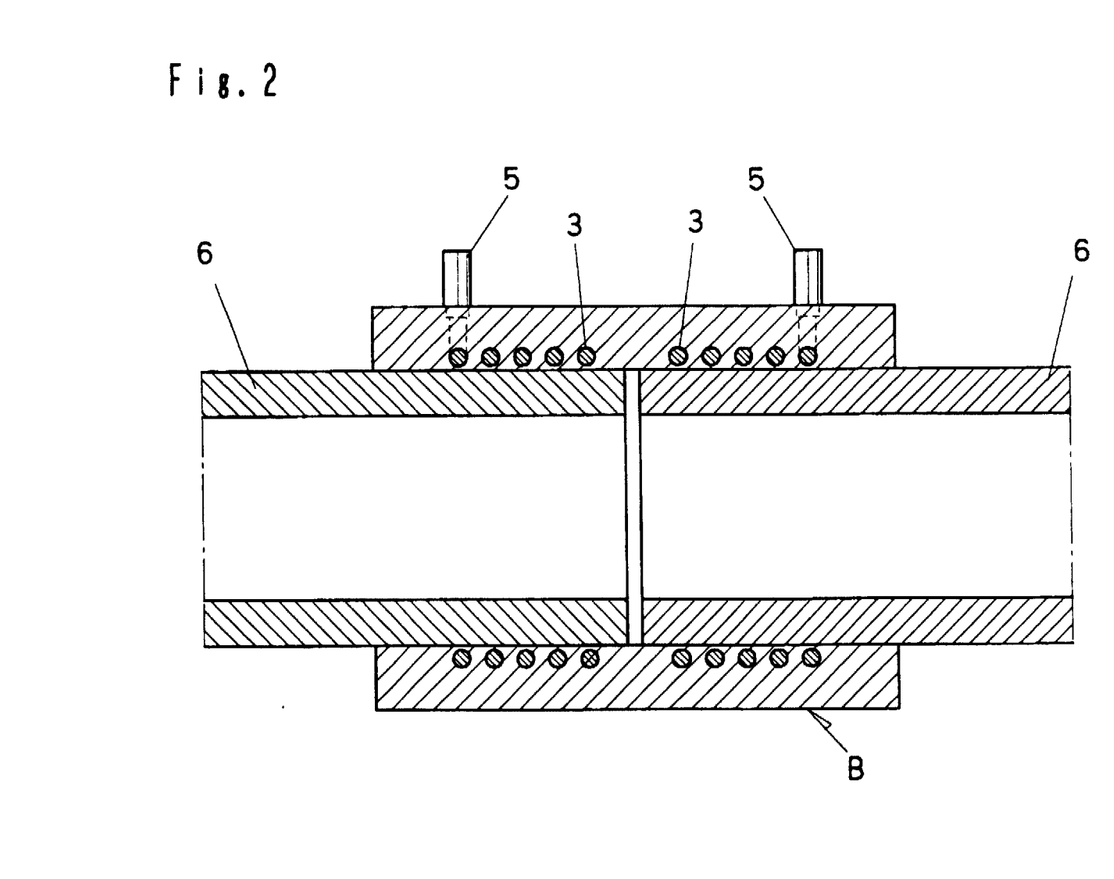
FIG. 2 is also a cross section of EF joint members that are being welded in another embodiment.

In another example wherein a coiled bare electric wire 3 is embedded in the inner periphery of the EF joint 'A' as shown in FIG. 2, the fusion accelerating composition may also be painted or other applied to both or either of the inner periphery of EF joint 'A' and the outer periphery of gas pipe 6. Alternatively, the tape containing or covered with the fusion accelerator may be wound on both or either of the joint inner periphery and the pipe outer periphery. It is also possible in this example to use the syringe in the manner described above.

Second Embodiment

Figure 3:
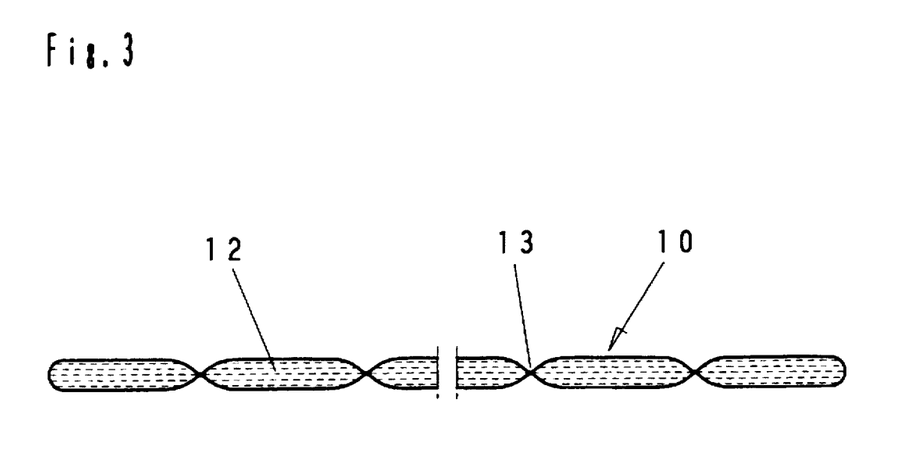
FIG. 3 illustrates a capillary tube made of a resin and designed such that a fusion accelerator is supplied to the members in the method of the present invention.
Figure 4:
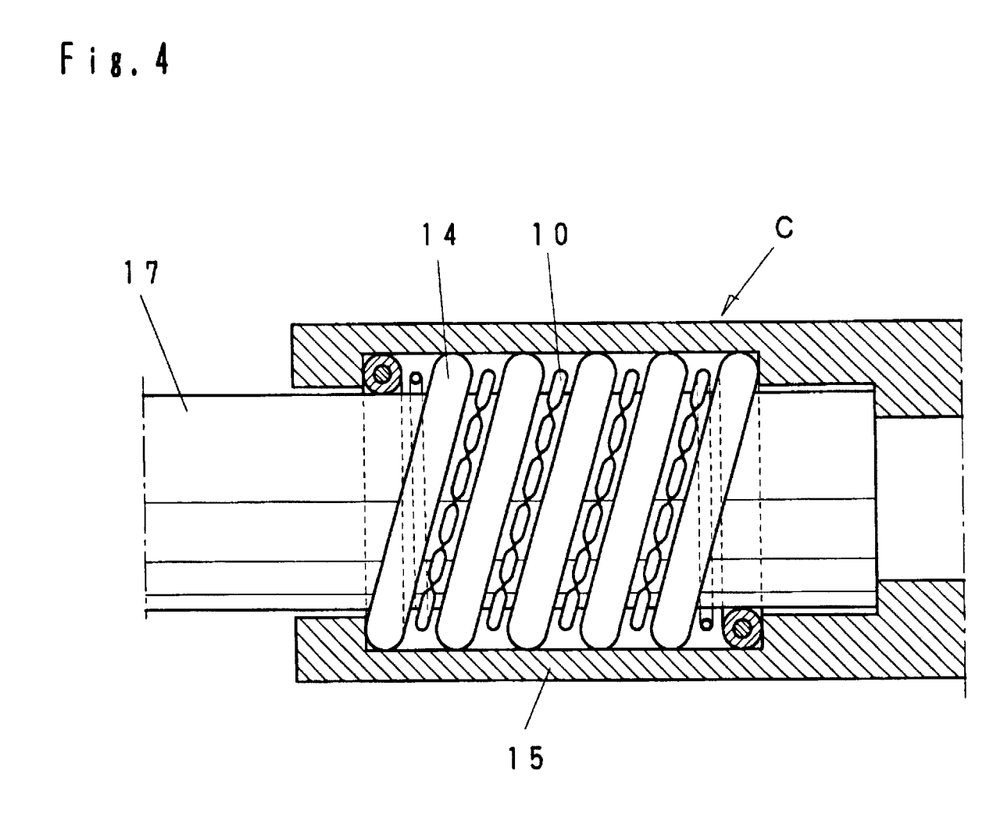
FIG. 4 is a cross section of the capillary tube illustrated in FIG. 3 and incorporated in the EF joint, being shown in a state that an electric current is not supplied yet through a heating wire.
Figure 5:
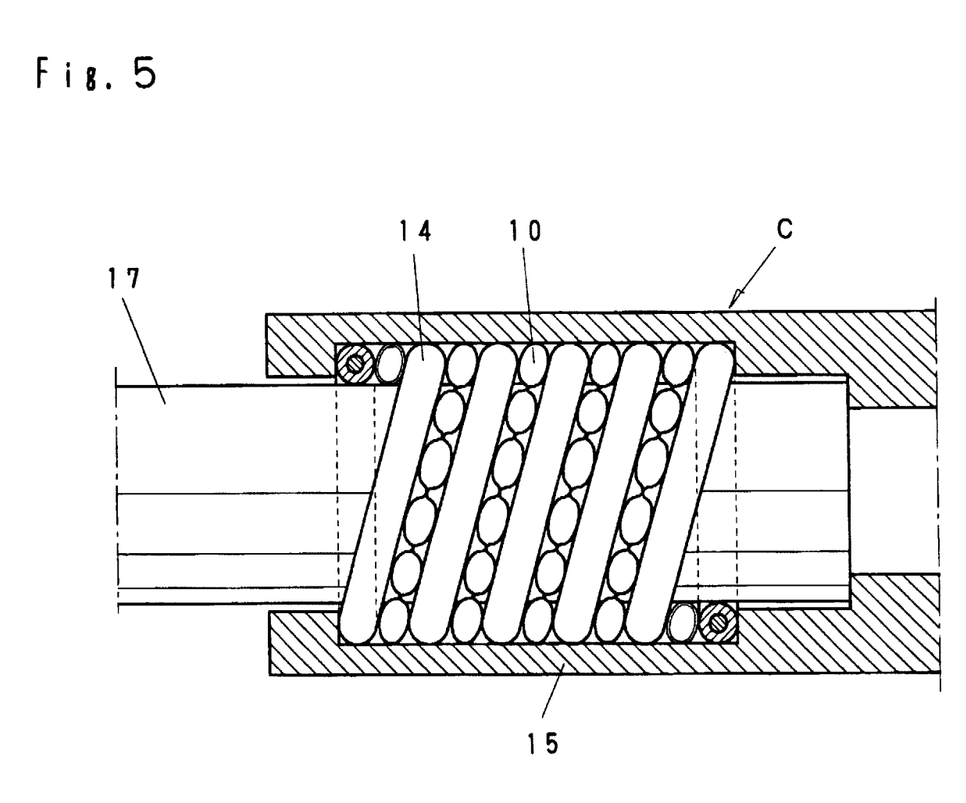
FIG. 5 is similarly a cross section of the capillary tube in its state after supply of the current.

FIGS. 3 to 5 schematically illustrate a second embodiment in which a chain of capsules as shown in FIG. 3 is used.

A resin capillary tube 10 liquid-tightly holding an amount of 2,5-dimethyl-2,5-bis(t-butyl-peroxy)hexane (viz., a fusion accelerator) 12 has a series of constricted and fused wall portions 13 at regular intervals along the tube. A chain of 'capsules' are thus formed longitudinally of said tube 10, and the latter will be wound together with the covered Nichrome (trademark) wire 14 around a pipe 17. This pipe made of a resin difficult to fuse and having those tube 10 and wire 14 wound thereon will be inserted into a socket 15 of a joint 'C', in a manner shown in FIG. 4. The joint 'C' is also formed of a resin difficult to melt.

In fusion welding the members, the Nichrome wire will heat them to a high temperature such that the accelerator 12 decomposes and boils. As a result, the capillary tube 10 will expand as shown in FIG. 5 and the vacant spaces or crevices present between the joint 'C', pipe 17 and wire 14 are filled with the expanded tube. Subsequently, those capsules of the tube 10 will be broken due to the high temperature, whereby an amount of decomposition products and gas of the accelerator 12 will spread over the contact surfaces of the members to be fusion welded. The capsules formed by constricting the tube 10 at 13 are advantageous in that even if one or some of the capsules would be broken during storage or use of the joint 'C', the leakage and loss of said fusion accelerator will be diminished not to adversely affect the fusion welding process, thus improving the reliability of the joint.

Third Embodiment

The following ingredients were kneaded to give a coating resin composition ('parts'=parts by weight):

| | |
|---|---|
| 2,5-dimethyl-2,5-bis(t-butylperoxy) hexane (fusion accelerator) | 100 parts |
| guanidine (ibid.) | 5 parts |
| quinone-dioxyquinone (ibid.) | 5 parts |

An amount of zeolite (that is a porous mineral powder) was impregnated with this liquid composition, and a block thus prepared was inserted in a joint to be fusion welded.

Fourth Embodiment

The following ingredients were kneaded to give a coating resin composition ('parts'=parts by weight):

| | |
|---|---|
| mixture of a hydrocarbon grease and a silicone grease | 100 parts |
| 2,5-dimethyl-2,5-bis(t-butylperoxy) hexane (fusion accelerator) | 20 parts |
| trimethylol propane (ibid.) | 1 part |

A length of Nichrome wire was coated with this composition, before insertion into a joint.

Fifth Embodiment 2,5-dimethyl-2,5-bis(t-butylperoxy) hexane (provided as an 'EPT' diluted sheet) was used to coat a length of heating nickel wire. The length of nickel wire was disposed between a pair of cross-linked resin articles difficult to melt, and a current was fed through the wire to fusion weld them together.

Sixth Embodiment

A resin covering of an electric wire to be interposed between resin articles that are to be welded is impregnated with peroxides in this embodiment. The peroxide will decompose and chemically react with the resin articles when the latter are heated, thereby facilitating the fusion welding thereof.

The material of such a resin covering may be prepared by heating and melt kneading a 'suitable' resin or rubber, within atmosphere or within oxygen gas, so as to produce a desired amount of peroxides and/or hydroperoxides. The suitable resin or rubber has in its molecule an unsaturated bond such as a double bond, particularly a double bond conjugated with an allyl group, or has an acrylic or methacrylic group. Such a resin or rubber is usually selected from a group consisting of: a butadiene resin; styrene-butadiene rubber; butadiene rubber; isoprene rubber; EPM; EPDM; nitrile-butadiene rubber; chloroprene rubber; butyl rubber; polyethylene rubber; polyisobutylene; coumarone resins; unsaturated polyester resins; furan resins; petroleum resins, particularly cyclopentadine-based ones; polyhydroxy-polyoleffins; maleic resins; fumaric resins; polyalcohol methacrylates; and the like. It will be understood that if a sufficient amount of such peroxides or hydroperoxides are already contained in the selected resin or rubber, then it need not be heated and kneaded in atmosphere or oxygen gas. It is also possible to irradiate the raw resin or rubber with ultraviolet beams, or to add to it a necessary amount of compounds that contain such peroxides or hydroperoxides.

The unsaturated group or groups may be present in a main chain or a branch of the resin molecule. The resin or rubber noted above may be blended with a proper amount of any of compounds that contain in their molecule an unsaturated group. Such compounds include: esters of oleic acid; esters of stearic acid; ester of lauric acid; polyethyleneglycol diacrylates; and the like.

The hydroperoxide ions may be stabilized to a desired degree, if necessary, by adding to the resin material an appropriate amount of: any trialkyl amine; methacrylic acid, its metal salts, more desirably its nickel complex; 2-methacrylyloxy-ethyl acid phosphate, its metal salts, more desirably its nickel complex; or di-2-methacrylyloxy-ethyl acid phosphate, its metal salts, or more desirably its nickel complex.

As described above, the resin containing the unsaturated bonds is heated in air or in oxygen gas to provide a wire covering material which contains the peroxides.

A proper extruder may be used to treat with an elongate heating element 2, whose core wire 3 is precoated with an insulating sheath 3b. The extruder will be operated to coat the sheath 3b with a covering resin composition 4 (previously prepared) in a manner shown in FIG. 6.

Figure 7:
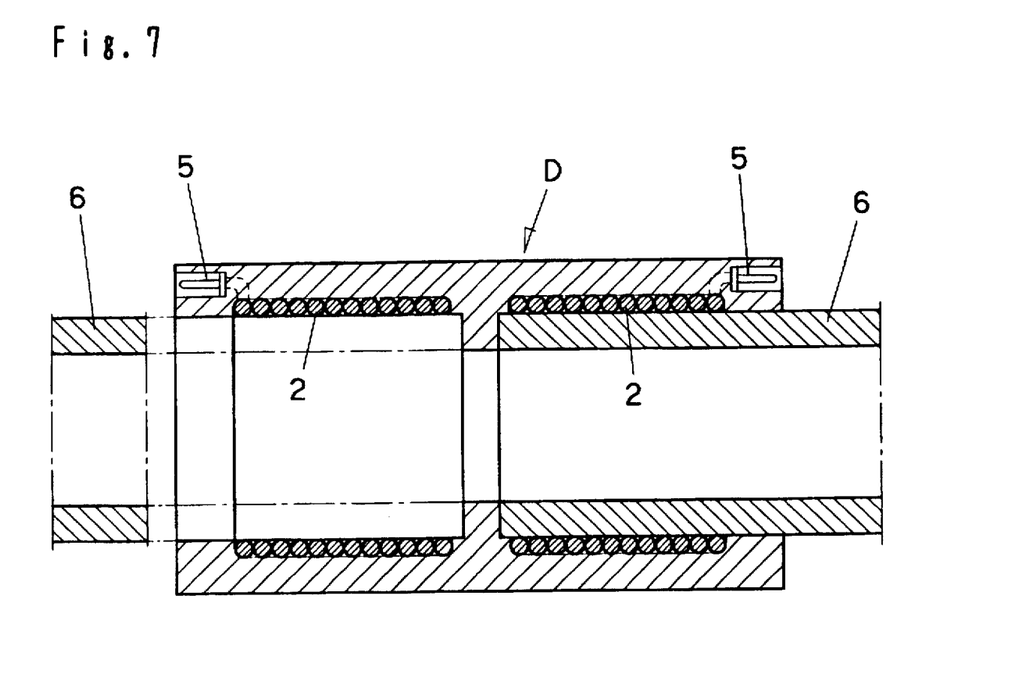
FIG. 7 is a cross section of the elongate heating element used to weld the EF joint.

FIG. 7 illustrates a manner of bonding the ends of pipes 6 to a joint 'D'. A controller (not shown) will operate to heat the wire 3 of heating element 2 to about 200–300 degrees centigrade at an initial stage. These members are maintained at this temperature for several tens seconds to melt the resin covering 4 as well as the surfaces of resin articles 6 and 'D' in contact the covering. During the initial stage, the peroxides and unsaturated bonds in the resin composition 4 will be severed each into radicals, which cause dehydrogenation of the resin article surfaces, chemically re-bonding the molecules thereof. At a final stage, the controller heats the wire 3 of the heating wire 2 to 300–350 degrees centigrade and keeps it at this temperature also for several tens seconds. As an effect of this final stage, the molten resin molecules will undergo a certain polymerization at their unsaturated bonds, resulting in new cross linkings, thus affording an improved weld strength.

In some cases, the presence of only the peroxides in the resin covering will suffice for the fusion bond of the resin articles difficult to melt, due to chemical reactions therewith. However, coexistence of unsaturated bonds is more preferable because they generate additional peroxides that will not only make more reliable the chemical reaction between the adjacent members but also give rise to favorable cross linkings between the adjacent resin molecules to enhance the weld strength.

Figure 6:
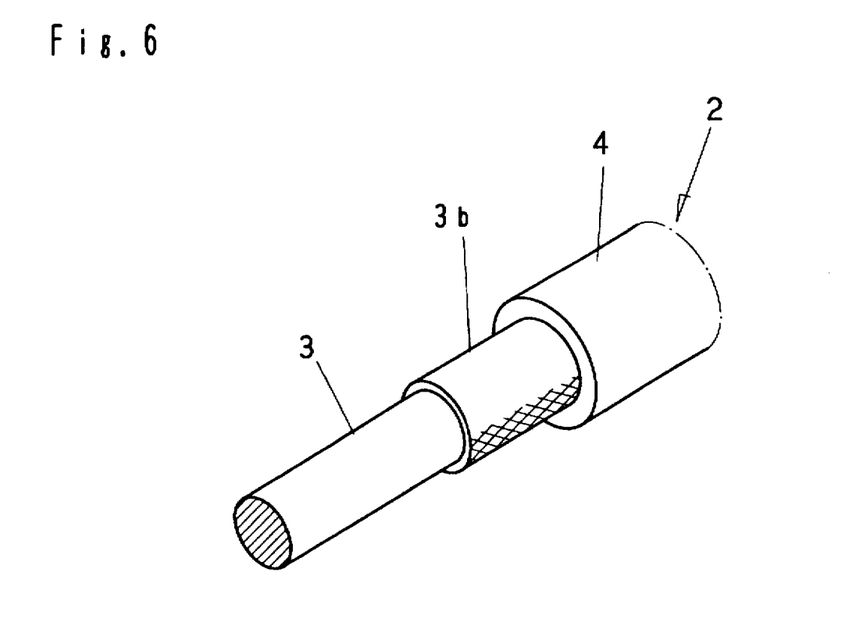
FIG. 6 is a perspective view of an elongate heating element used in still another embodiment of the present invention.

Superficial oxidation of the resin covering 4 for the electric wire is not sufficient to ensure the chemical effect noted above (viz., radical reactions, dehydrogenation, polymerization and chemical re-bonding). It will be difficult to efficiently carry out such a hypothetical superficial treatment on a commercial scale. For these reasons, a mass of the resin coating material is subjected to the oxidation in the present method.

There are chemical bonds between the peroxides or hydroperoxides and the resin molecules, so that any noticeable amount of smelling hazardous byproducts will not be liberated to the outside. Only a small amount of nontoxic water and/or its vapor will be emitted outwards in a case wherein the hydroperoxides are used.

In summary, the fusion accelerator added to the resin member interposed between the resin articles difficult to melt will destroy the fusion retarder included therein, thus making it possible to strongly weld them in a shorter time.

Thanks to such an improved fusion welding, final welded products of an improved quality can now be manufactured inexpensively, and any product that has not been possible to make by the welding can now be manufactured very easily.

What is claimed is:

1. A method of fusion welding resin articles difficult to melt due to a fusion retarder present in the articles in the form of a fusion retarding element or structure, the articles having surface portions in contact with each other so as to be bonded one to another, the method comprising the steps of:

applying a fusion accelerator to the surface portions, with the accelerator being capable of destroying the fusion retarder when heated;

then heating the resin articles so that the fusion accelerator destroys the fusion retarder, whereby the surface portions melt to effect the fusion welding; and finally allowing the resin articles to cool down.

2. A method of fusion welding resin articles difficult to melt due to a fusion retarder present in the articles in the form of a fusion retarding element or structure, the articles having surface portions in contact with each other so as to be bonded one to another, the method comprising the steps of:

previously painting a fusion accelerator to the surface portions, with the accelerator being capable of destroying the fusion retarder when heated;

then heating the resin articles so that the fusion accelerator destroys the fusion retarder, whereby the surface portions melt to effect the fusion welding; and finally allowing the resin articles to cool down.

3. A method of fusion welding resin articles difficult to melt due to a fusion retarder present in the articles in the form of a fusion retarding element or structure, the articles having surface portions in contact with each other so as to be bonded one to another, the method comprising the steps of:

applying a material selected from a group consisting of a tape impregnated or coated with a fusion accelerator and a tube in which the fusion accelerator is embedded to the surface portions, with the accelerator being capable of destroying the fusion retarder when heated;

then heating the resin articles so that the fusion accelerator destroys the fusion retarder, whereby the surface portions melt to effect the fusion welding; and finally allowing the resin articles to cool down.

4. A method of fusion welding resin articles difficult to melt due to a fusion retarder present in the articles in the form of a fusion retarding element or structure, the articles having surface portions in contact with each other so as to be bonded one to another, the method comprising the steps of:

using an applicator for applying from the outside a fusion accelerator to the surface portions, with the accelerator being capable of destroying the fusion retarder when heated;

then heating the resin articles so that the fusion accelerator destroys the fusion retarder, whereby the surface portions melt to effect the fusion welding; and finally allowing the resin articles to cool down.

5. A method of fusion welding resin articles difficult to melt due to a fusion retarder present in the articles in the form of a fusion retarding element or structure, the articles having surface portions in contact with each other so as to be bonded one to another, the method comprising the steps of:

using an applicator for applying from the outside a fusion accelerator to the surface portions, with the accelerator being capable of destroying the fusion retarder when heated;

heating the resin articles simultaneously with the step of using the applicator so that the fusion accelerator destroys the fusion retarder, whereby the surface portions melt to effect the fusion welding; and finally allowing the resin articles to cool down.

6. A method of fusion welding resin articles difficult to melt due to a fusion retarder present in the articles in the form of a fusion retarding element or structure, the articles having surface portions in contact with each other so as to be bonded one to another, the method comprising the steps of:

setting in place a heating element between the surface portions, with the heating element composed of a heating wire covered with an insulating sheath that contains a fusion accelerator capable of destroying the fusion retarder when heated;

then supplying an electric current through the heating wire to heat the resin articles so that the fusion accelerator destroys the fusion retarder, whereby the surface portions melt to effect the fusion welding; and finally allowing the resin articles to cool down.

7. A method of fusion welding resin articles difficult to melt due to a fusion retarder present in the articles in the form of a fusion retarding element or structure, the articles having surface portions in contact with each other so as to be bonded one to another, the method comprising the steps of:

setting in place a heating element between the surface portions, with the heating element composed of a heating wire covered with an insulating sheath that has a surface coated with a fusion accelerator capable of destroying the fusion retarder when heated;

then supplying an electric current through the heating wire to heat the resin articles so that the fusion accelerator destroys the fusion retarder, whereby the surface portions melt to effect the fusion welding; and finally allowing the resin articles to cool down.

8. A method of fusion welding resin articles difficult to melt due to a fusion retarder present in the articles in the form of a fusion retarding element or structure, the articles having surface portions in contact with each other so as to be bonded one to another, the method comprising the steps of:

setting in place a heating element between the surface portions, with the heating element composed of a heating wire covered with an insulating sheath that in turn is covered with a material selected from a group consisting of a tape impregnated or coated with a fusion accelerator and a tube in which the fusion accelerator is embedded, with the accelerator being capable of destroying the fusion retarder when heated;

then supplying an electric current through the heating wire to heat the resin articles so that the fusion accelerator destroys the fusion retarder, whereby the surface portions melt to effect the fusion welding; and     finally allowing the resin articles to cool down.

9. A method of fusion welding resin articles difficult to melt due to a fusion retarder present in the articles in the form of a fusion retarding element or structure, the articles having surface portions in contact with each other so as to be bonded one to another, the method comprising the steps of:

setting in place a resin composition between the surface portions, with the composition contains a n amount of peroxides;

then heating the resin articles together with the resin composition so that the peroxides destroy the fusion retarder, whereby the surface portions fuse together with the resin composition; and     finally allowing the resin articles to cool down to thereby finish the fusion welding.

\* \* \* \* \*